US011847629B1

(12) United States Patent
Mehta et al.

(10) Patent No.: US 11,847,629 B1
(45) Date of Patent: Dec. 19, 2023

(54) RESILIENT WORKFLOWS DEPENDENT ON EXTERNAL COMPUTING SYSTEMS

(71) Applicant: Amazon Technologies, Inc., Seattle, WA (US)

(72) Inventors: Uttaresh Mehta, Seattle, WA (US); Lakhshya Bansal, Seattle, WA (US); Sriram Chandrasekaran, Bellevue, WA (US); Karthik Seetharaman, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/476,643

(22) Filed: Sep. 16, 2021

(51) Int. Cl.
G06Q 20/20 (2012.01)
G06Q 20/22 (2012.01)
G06Q 20/12 (2012.01)

(52) U.S. Cl.
CPC ........... G06Q 20/227 (2013.01); G06Q 20/12 (2013.01); G06Q 20/204 (2013.01)

(58) Field of Classification Search
None
See application file for complete search history.

(56) References Cited

U.S. PATENT DOCUMENTS

| | | | |
|---|---|---|---|
| 2013/0211934 A1* | 8/2013 | Balasubramanian | G06Q 30/04 705/16 |
| 2015/0286997 A1* | 10/2015 | Zimmerman | G06Q 20/367 705/39 |
| 2015/0332230 A1* | 11/2015 | Gaines | G06Q 20/322 705/27.1 |
| 2017/0270519 A1* | 9/2017 | Purves | G06Q 20/385 |
| 2017/0351889 A1* | 12/2017 | Govindarajan | G06K 7/10465 |
| 2021/0312339 A1* | 10/2021 | Stogo | G06Q 20/24 |

* cited by examiner

Primary Examiner — Joseph W. King
(74) Attorney, Agent, or Firm — Thomas | Horstemeyer, LLP

(57) ABSTRACT

Disclosed are various embodiments for resilient workflows dependent on external computing systems. In one embodiment, one or more steps in a workflow are determined to invoke a request to an external computing system. Availability information for the external computing system is determined. The external computing system is detected to be potentially unavailable before a request within a workflow is submitted via an application programming interface (API) for processing by the external computing system. An indication is provided that an integration with the external computing system is unavailable in response to detecting that the external computing system is potentially unavailable.

20 Claims, 6 Drawing Sheets

RESILIENT WORKFLOWS DEPENDENT ON EXTERNAL COMPUTING SYSTEMS

BACKGROUND

With the prevalence of interconnected computing systems, it is often the case that a first entity will integrate its systems with those of a second entity. These integrations can allow for the first entity to offer functionality provided by the second entity that may not be supported by the first entity itself. However, introducing external dependencies may make systems of the first entity more susceptible to downtime and less reliable.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
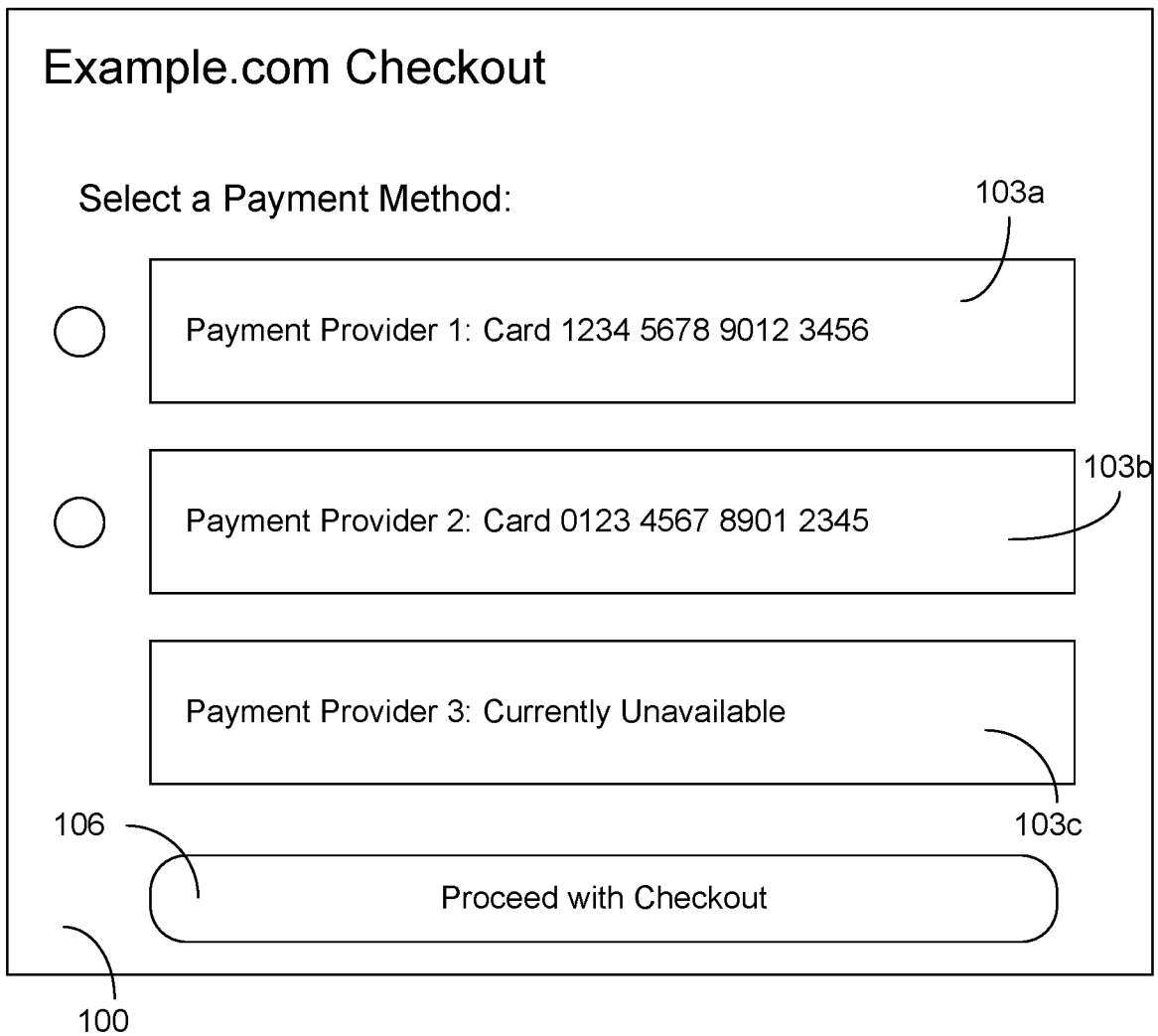
FIG. 1 is a drawing of an example user interface corresponding to a checkout page for an electronic commerce provider according to various embodiments of the present disclosure.

The present disclosure relates to resilient workflows that are dependent on external computing systems. Often a service provided by one organization or entity includes one or more dependencies on one or more external systems provided by other organizations or entities. In one example, an electronic commerce provider generates a list of shipping quotations for an order that are obtained by querying external computing systems operated by a plurality of different shipping carriers. In another example, an electronic commerce provider presents a customer with multiple payment options offered by a plurality of different payment processing providers, where payment for an order is consummated by systems of the electronic commerce provider communicating with external computing systems operated by the respective payment processing providers. In yet another example, a news content provider includes a commenting feature on each of its content pages, where the commenting feature is operated by a social networking provider. In still another example, an email provider may scan email attachments using malware scanning provided by one or more malware scanning providers. In yet another example, an electronic commerce provider integrates with a particular foreign exchange provider to determine foreign exchange amounts. Generally, a first entity integrates its systems with the external systems of the second entity by developing custom code for an application programming interface (API) specific to the second entity. Accordingly, if the first entity supports integrations with multiple second entities as alternatives, the first entity will develop custom code for multiple APIs corresponding to the respective second entities.

Although integrating with external systems facilitates on-line functionality that might not otherwise be possible solely with internal systems, external integrations often introduce a higher likelihood of errors and downtime. Further, the errors and/or downtime may occur without advance warning from the entities operating the external systems. Failure to properly handle errors and downtime from external systems leads to diminished user experiences.

For example, suppose that an electronic commerce provider allows a user to choose from a set of three payment processing providers to make a payment for an order. Although two of the three are functioning normally, the third may be generating errors 50% of the time. If the user were to proceed with the third payment processing provider and experience an error, the user may decide not to proceed with the order at all. Also, in one example, inventory is reserved within inventory management systems for an order that is destined to fail due to the selected payment processing provider. Further, users in some cases attribute technology failures of the payment processing provider to the electronic commerce provider because the users are interacting with the electronic commerce provider's web site or application, even though the payment processing provider's systems caused the failures. It would be optimal to detect the issues occurring with the third payment processing provider and to eliminate that provider as an option rather than to allow a user to select the third payment processing provider and potentially cause the order to fail or be delayed due to errors from the payment processing provider.

Various embodiments of the present disclosure introduce resilient workflows that are equipped to handle errors or downtime occurring due to integrations with external computing systems. As will be described, the system monitors the availability of external computing systems via several approaches. In one example, the system leverages a combination of success rate-based availability, canary polling-based availability, schedule-based availability, and manual availability to determine whether to include or exclude an integration with a particular external computing system. By excluding a problematic integration before the problematic integration is selected by a user, user interaction with the integration that would ordinarily occur before the integration fails is thereby avoided. Consequently, the overall user experience is improved.

FIG. 1 shows an example user interface 100 corresponding to a checkout page for an electronic commerce provider. The user interface 100 is generated for a particular user and customized to show three payment methods 103 that have been previously configured for the user's account with the electronic commerce provider. Each of the payment methods 103 correspond to different payment processing providers in this example, but in other examples, multiple payment methods 103 may correspond to a particular payment processing provider. In one example, a user has two credit cards issued by a single payment processing provider.

Of the three payment methods 103 in this example, two are determined to be available (i.e., payment method 103*a* and payment method 103*b*), and one is determined to be unavailable (i.e., payment method 103*c*). Accordingly, the user is able to select (e.g., via a radio button or another user interface selection component) the payment method 103*a* and/or the payment method 103*b* to proceed with the checkout workflow. However, the user is unable to select the payment method 103*c* that is determined to be unavailable. In various examples, the payment method 103*c* is grayed out, contains a warning, or is otherwise non-selectable.

Upon selecting one or more of the payment methods 103*a* or 103*b*, the user selects the submission component (e.g., a button or other user interface component) to continue with the checkout workflow. Subsequently, preliminary confirmation user interfaces are presented in some examples, and after the user finalizes the order, a final confirmation is presented. Conveniently, because the payment method 103*c* is not selectable, a payment processing failure is avoided. As will be described, the system herein is able to predict that the payment method 103*c* is unavailable before proceeding with a particular checkout workflow and contacting the payment processing provider.

In another example, the payment methods 103 that are determined to be unavailable are omitted entirely from the user interface 100. In another example, the payment methods 103 that are determined to be unavailable are still capable of selection but with a warning that the payment may not succeed due to the likely unavailability of the payment processing provider.

As one skilled in the art will appreciate in light of this disclosure, certain embodiments may be capable of achieving certain advantages, including some or all of the following: (1) reducing resource consumption of computer systems (e.g., in terms of processor time and memory utilization) by refraining from invoking integrations with external computing systems that are highly likely to fail; (2) improving the user experience by modifying user interfaces to deemphasize or remove components that would invoke integrations that are unlikely to succeed; (3) improving the user experience by suppressing network-related errors and other failures; (4) improving the functioning of the computer systems by making workflows that rely upon external computer systems more resilient; (5) improving the functioning of the computer systems by utilizing machine learning models to determine adaptively when integrations with external systems are sufficiently reliable; and so forth. In the following discussion, a general description of the system and its components is provided, followed by a discussion of the operation of the same.

Figure 2:
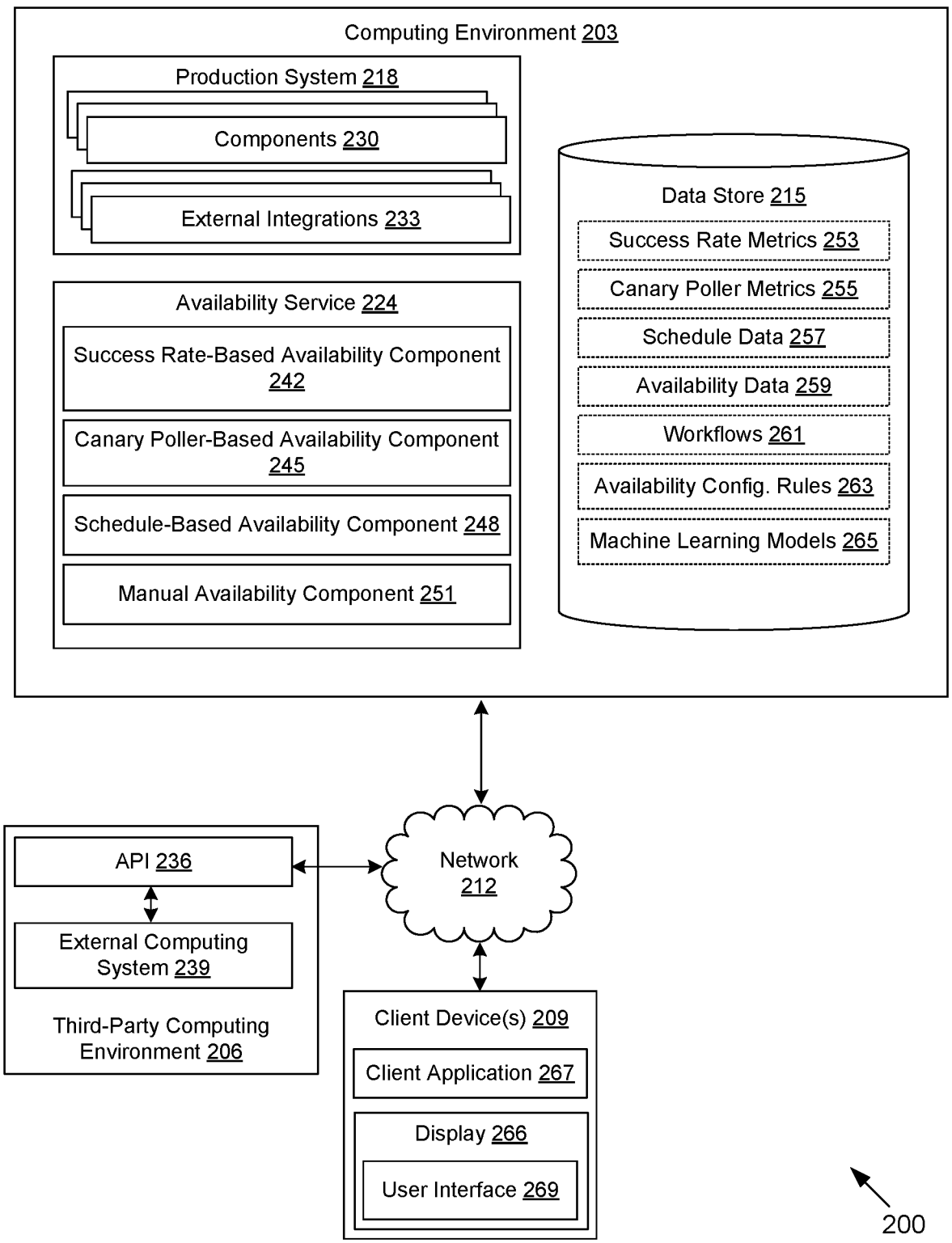
FIG. 2 is a schematic block diagram of a networked environment according to various embodiments of the present disclosure.

FIG. 2 illustrates a networked environment 200 according to various embodiments. The networked environment 200 includes a computing environment 203, a third-party computing environment 206, and one or more client devices 209, which are in data communication with each other via a network 212. The network 212 includes, for example, the Internet, intranets, extranets, wide area networks (WANs), local area networks (LANs), wired networks, wireless networks, cable networks, satellite networks, or other suitable networks, etc., or any combination of two or more such networks.

In one or more embodiments, the computing environment 203 comprises, for example, a server computer or any other system providing computing capability. Alternatively, the computing environment 203 in one or more embodiments employs a plurality of computing devices that may be arranged, for example, in one or more server banks or computer banks or other arrangements. Such computing devices are in some examples located in a single installation or distributed among many different geographical locations. For example, the computing environment 203 includes a plurality of computing devices that together may comprise a hosted computing resource, a grid computing resource, and/or any other distributed computing arrangement. In some cases, the computing environment 203 corresponds to an elastic computing resource where the allotted capacity of processing, network, storage, or other computing-related resources may vary over time.

Various applications and/or other functionality are executed in the computing environment 203 according to various embodiments. Also, various data is stored in a data store 215 that is accessible to the computing environment 203. The data store 215 in some cases is representative of a plurality of data stores 215 as can be appreciated. The data stored in the data store 215, for example, is associated with the operation of the various applications and/or functional entities described below.

The components executed on the computing environment 203, for example, include a production system 218, an availability service 224, and/or other components. The production system 218 is executed to provide a live production service on behalf of the operator of the computing environment 203. In one embodiment, the production system 218 is an order placement, processing, and fulfillment system operated by an electronic commerce provider. The production system 218 includes one or more components 230, which are systems and subsystems that operate to provide the service(s) of the production system 218. The production system 218 includes one or more external integrations 233 that integrate the components 230 with application programming interfaces (APIs) 236 of external computing systems 239 executed in third-party computing environments 206.

The availability service 224 is executed to determine the predicted availability of external computing systems 239 using a combination of data sources. In one embodiment, the availability service 224 includes a success rate-based availability component 242, a canary poller-based availability component 245, a schedule-based availability component 248, a manual availability component 251, and/or other components. Ultimately, the determination of predicted availability, or predicted unavailability, is used by the production system 218 in order to enable or disable specific external integrations 233 and/or to configure their operation in order to adapt to predicted unavailability.

The success rate-based availability component 242 determines whether workflows invoking external integrations 233 are successful over time. The execution of multiple workflows over time will end in results that indicate that the external computing system 239 successfully handled a request from the external integration 233 or that the external computing system 239 did not successfully handle the request. In some instances, failures are explicitly returned by the external computing system 239, while in other instances, failures are inferred from incorrect responses from the external computing system 239 (e.g., improper rejection of all requests via the API 236) or from a lack of responses from the external computing system 239 (e.g., request timeouts via the API 236). In some scenarios, the success rate-based availability component 242 determines that failures for an external computing system 239 are associated with certain types of workflows or requests (e.g., requests originating from a particular region), but not other types of workflows or requests.

The canary poller-based availability component 245 is configured to assess the health of an external computing system 239 by way of polling requests. In some cases, the results of the polling requests indicate problems in advance of failure of production requests. In one example, the canary poller-based availability component 245 makes periodic requests to an API 236 of an external computing system 239 to determine whether the external computing system 239 is available or unavailable. In some cases, the API 236 explicitly supports system health polling checks. In other cases, the canary poller-based availability component 245 makes a standard call to an API 236 that would otherwise be used by the external integration 233 in order to assess whether the call successfully completes. If the call successfully completes, the canary poller-based availability component 245 in one example is configured to subsequently cancel or reverse the action requested in the call. The canary poller-based availability component 245 in some examples is configured to poll an external computing system 239 periodically only when corresponding requests from the production system 218 are scarce or infrequent (e.g., if a corresponding production request is not received within the past hour or some other time period).

The schedule-based availability component 248 receives scheduled downtime data for the external computing systems 239. In one example, a particular external computing system 239 publishes a time window for future scheduled downtime (e.g., a maintenance window on Sunday morning between midnight and 3 a.m.). In another example, the particular external computing system 239 sends a notification that it is currently unavailable to respond to requests, potentially with an estimated duration or time at which the particular external computing system 239 will again become available.

The manual availability component 251 receives manual notification of downtime for particular external computing systems 239. In one example, agents receive notifications from end users regarding errors resulting from failure of requests sent a particular external computing system 239. In another example, agents receive internal notifications of errors. In yet another example, agents receive notifications of downtime through communication with personnel representing the external computing system 239.

The data stored in the data store 215 includes, for example, one or more success rate metrics 253, one or more canary poller metrics 255, schedule data 257, availability data 259, one or more workflows 261, one or more availability configuration rules 263, one or more machine learning models 265, and/or other data. The success rate metrics 253 include information indicating whether instances of workflows 261 (e.g., checkout payment workflows 261) for particular external integrations 233 and requests are successful. In addition to success or failure, the success rate metrics 253 may include metadata regarding aspects of the failed workflows 261 so that correlations with failures or successes are determined. In various examples, such metadata includes customer location or region, time, date, order amounts, frequency of requests, and/or other data.

The canary poller metrics 255 includes the results of canary polling of the external computing systems 239, potentially via a health API 236 of the external computing systems 239. The schedule data 257 in various examples indicates scheduled downtimes for external computing systems 239 or manual configurations that indicate that a downtime for an external computing system 239 is likely to occur or will occur.

The availability data 259 is generated by the availability service 224 indicating whether a particular external computing system 239 is likely to be available or unavailable. As such, the availability data 259 in some cases is generated based upon a combination of data, such as a combination of the success rate metrics 254, the canary poller metrics 255, the schedule data 257, and/or other data. In some embodiments, the availability data 259 are summarized and displayed in a user interface such as an administrative dashboard, with user interface components to manage remedial actions such as to exclude or modify how external integrations 233 are used. In some cases, the administrative dashboard may include recommendations for actions in view of the availability data 259.

The workflows 261 correspond to the processes used by the production system 218 and its components 230 that include one or more external integrations 233. In various implementations, the workflows 261 include checkout workflows in which payments are made for orders through payment providers, shipping quotation workflows in which shipping quotations are obtained from shipping carriers, subscription workflows in payments are automatically made through payment processing providers for recurrent orders, payment account creation workflows in which payment methods are added to user accounts and confirmed via payment processing providers, foreign exchange workflows in which payment amounts are converted between currencies, partnership workflows in which an outside vendor system is relied upon to deliver a service or product to a customer, and so on.

The availability configuration rules 263 configure the response of the production system 218 to the availability data 259 generated by the availability service 224. The response is configured in order to mitigate the effect of potential or actual unavailability. In various examples, the availability configuration rules 263 configure the production system 218 to prevent a user-selectable component corresponding to an external integration 233 from being included in a user interface 100 (FIG. 1) or to alter its appearance in order to discourage selection. In another example, the availability configuration rules 263 cause an external integration 233 to retry an API request for a certain time period in view of a determined unavailability, or perhaps to wait an amount of time (e.g., until an outage is over) before submitting the API request. In such a scenario, the production system 218 accepts orders from customers with a plan to process payments later, even though the payment processing may be unsuccessful. In another example, the availability configuration rules 263 may configure an external integration 233 with one external computing system 239 to be disabled or modified based at least in part on determining that the external computing system 239 depends on another external computing system 239 that is determined to be likely unavailable. For instance, a particular payment processing provider is not able to process payments when a particular bank is offline, so the availability configuration rules 263 in this instance configure a user interface 100 to omit or modify a component corresponding to the particular payment processing provider. In another example, the availability configuration rules 263 configures requests that would ordinarily go to a first payment processing provider to instead go to a second payment processing provider.

The machine learning models 265 in various embodiments generate one or more availability configuration rules 263 in view of a training set of manual actions. The machine learning models 265 in one example automatically determine when and how to attempt to bring a disabled external integration 233 back online in view of updated data. The machine learning models 265 in another example automatically ascertain what types of success rate metrics 253 or canary poller metrics 255 should be met with what action in order to avoid abandoned workflows 261 or other undesirable results. Manual configurations in one example train the machine learning models 265, which in turn use regression analysis, cluster analysis, or another machine learning technique to generate optimal availability configuration rules 263 to control how the availability data 259 affects the operation of the production system 218.

In one or more embodiments, the third-party computing environment 206 comprises, for example, a server computer or any other system providing computing capability. Alternatively, the third-party computing environment 206 in one or more embodiments employs a plurality of computing devices that may be arranged, for example, in one or more server banks or computer banks or other arrangements. Such computing devices are in some examples located in a single installation or distributed among many different geographical locations. For example, the third-party computing environment 206 includes a plurality of computing devices that together may comprise a hosted computing resource, a grid computing resource, and/or any other distributed computing arrangement. In some cases, the third-party computing environment 206 corresponds to an elastic computing resource where the allotted capacity of processing, network, storage, or other computing-related resources may vary over time.

Various applications and/or other functionality are executed in the third-party computing environment 206 according to various embodiments. Also, various data is stored in a data store that is accessible to the third-party computing environment 206. The components executed on the third-party computing environment 206, for example, include an external computing system 239, an API 236, and other components.

The external computing system 239 is a system operated by a third party who is different from the operator of the production system 218. In some cases, the operator of the production system 218 and the third party are different internal entities of a larger organization, and the external computing system 239 is external in the sense that it is operated by a different internal entity. The production system 218 communicates with the external computing system 239 to perform a function. In some examples, the external computing system 239 is a payment processing system, a shipping carrier system, a procurement system, or another external system. The API 236 corresponds to code or settings that enables communication between the external computing system 239 and the external integrations 233. In one example, the API 236 supports requests to authorize and settle a payment. In another example, the API 236 supports requests for a shipping quotation. In various examples, the API 236 supports calls for system health checks for the external computing system 239.

The client device 209 is representative of a plurality of client devices 209 that may be coupled to the network 212. The client device 209 may comprise, for example, a processor-based system such as a computer system. Such a computer system may be embodied in the form of a desktop computer, a laptop computer, a personal digital assistant, a cellular telephone, a smartphone, a set-top box, a music player, a web pad, a tablet computer system, a game console, an electronic book reader, a smartwatch, a head mounted display, a voice interface device, or other devices. The client device 209 may include a respective display 266. The display 266 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 209 may be configured to execute various applications such as a client application 267 and/or other applications. The client application 267 may be executed in a client device 209, for example, to access network content served up by the computing environment 203 and/or other servers, thereby rendering a user interface 269 on the display 266. To this end, the client application 267 may comprise, for example, a browser, a dedicated application, etc., and the user interface 269 may comprise a network page, an application screen, etc. that enables placing an order, completing a payment workflow, adding a new payment account, and so on. The client device 209 may be configured to execute applications beyond the client application 267 such as, for example, email applications, social networking applications, word processors, spreadsheets, and/or other applications.

Figure 3A:
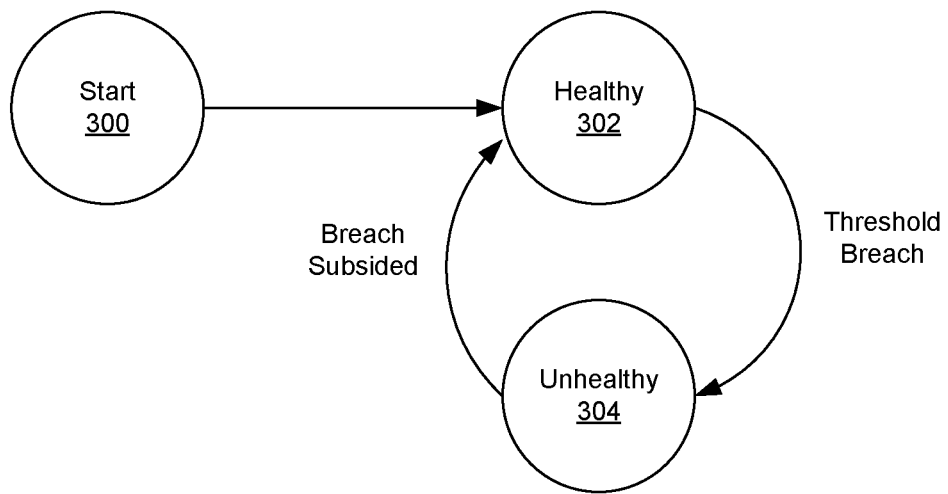
FIGS. 3A through 3D are state diagrams of components of an availability service according to various embodiments of the present disclosure.

FIG. 3A is a state diagram providing one example of state transitions in a success rate-based availability component 242 (FIG. 2). After starting at 300, the success rate-based availability component 242 enters a healthy state 302 indicating that a particular external computing system 239 (FIG. 2) is available and handling requests in workflows 261 (FIG. 2) satisfactorily. Upon breach of a threshold amount of failures or inaccuracies, the success rate-based availability component 242 transitions to an unhealthy state 304 for the particular external computing system 239. After determining that the breach has subsided, the success rate-based availability component 242 returns to the healthy state 302 for the particular external computing system 239.

Figure 3B:
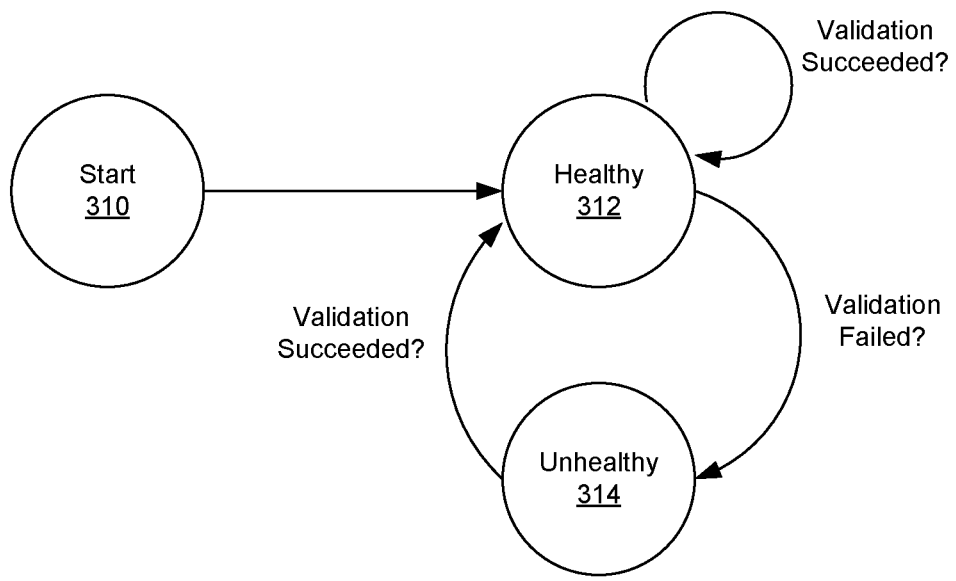

FIG. 3B is a state diagram providing one example of state transitions in a canary poller-based availability component 245 (FIG. 2). After starting at 310, the canary poller-based availability component 245 enters a healthy state 312 indicating that a particular external computing system 239 (FIG. 2) is available and responding to canary polling requests. If the requests continue to be validated, the canary poller-based availability component 245 continues to remain in the healthy state 312. If validation fails, the canary poller-based availability component 245 transitions to an unhealthy state 314. If validation subsequently succeeds, the canary poller-based availability component 245 transitions back to the healthy state 312.

Figure 3C:
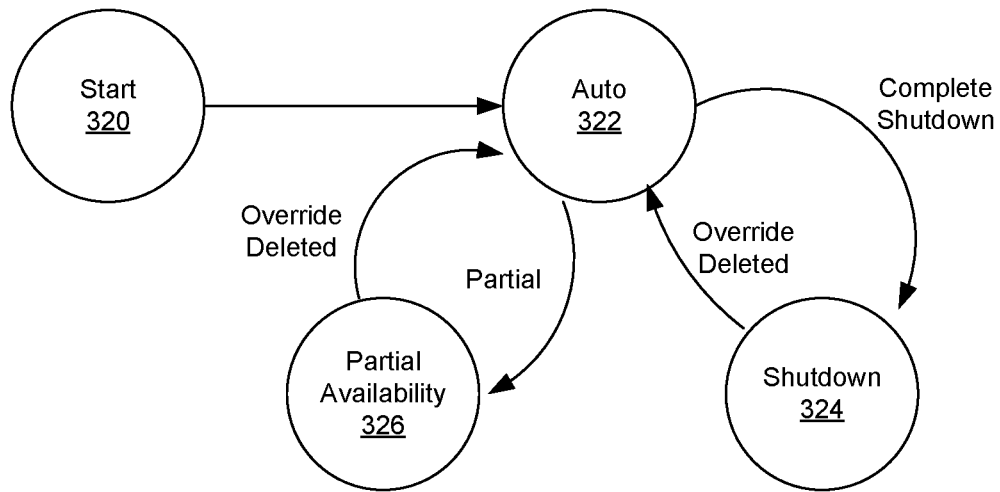

FIG. 3C is a state diagram providing one example of state transitions in a manual availability component 251 (FIG. 2). After starting at 320, the manual availability component 251 is in an automatic mode at state 322, allowing the availability service 224 (FIG. 2) to manage the external integrations 233 (FIG. 2) automatically based upon the availability data 259 (FIG. 2) and the availability configuration rules 263 (FIG. 2). If a manual operation directs a complete shutdown of an external integration 233, the manual availability component 251 transitions to the shutdown state 324. If the override is deleted, the manual availability component 251 returns to the automatic state 322. If a manual operation directs a partial shutdown, the manual availability component 251 transitions from the automatic state 322 to the partial availability state 326, where the external integration 233 is available in some instances or scenarios. If the override is deleted, the manual availability component 251 returns to the automatic state 322.

Figure 3D:
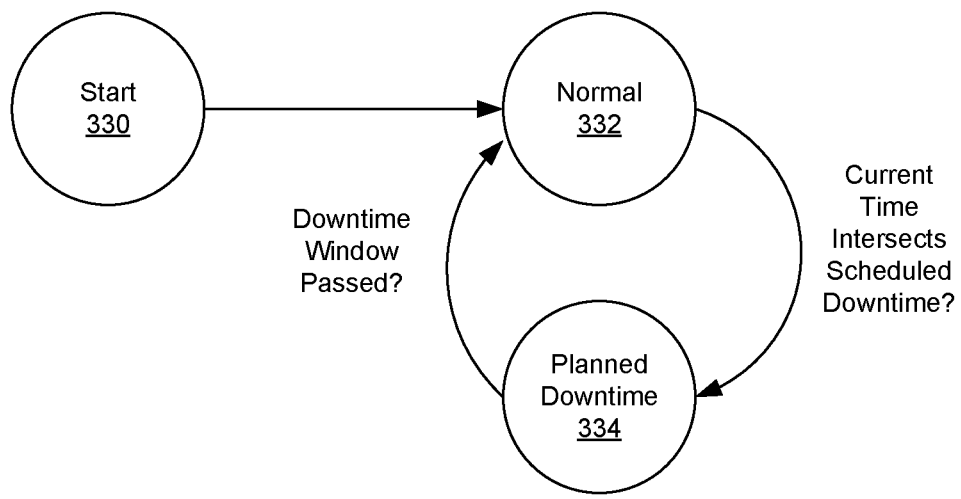

FIG. 3D is a state diagram providing one example of state transitions in a schedule-based availability component 248 (FIG. 2). After starting at 330, the schedule-based availability component 248 is in a normal state 332 for a particular external computing system 239 (FIG. 2). If the schedule-based availability component 248 determines that the current time intersects with a planned downtime for the external computing system 239 according to the schedule data 257 (FIG. 2), the schedule-based availability component 248 transitions to the planned downtime state 334, where the external integration 233 (FIG. 2) is altered or made unavailable. Upon passage of the downtime window, the schedule-based availability component 248 returns to the normal state 332.

Figure 4:
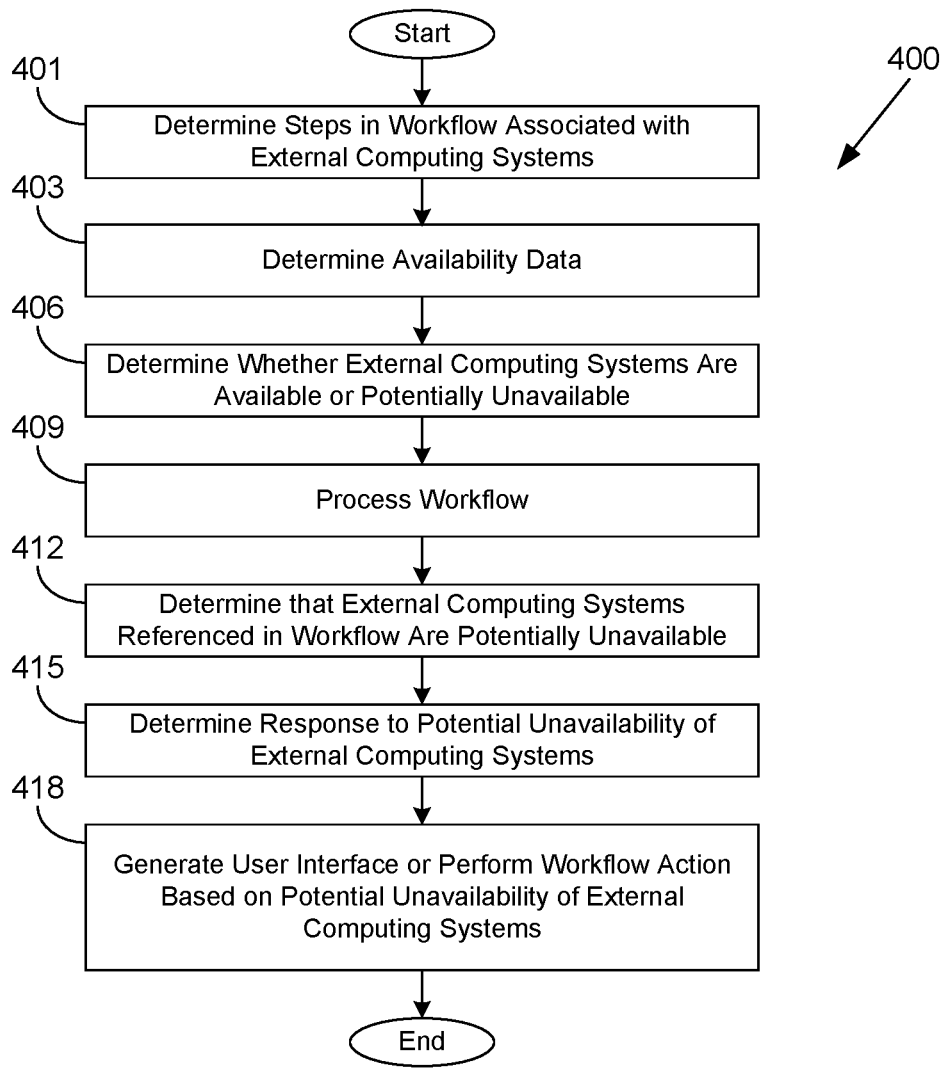
FIG. 4 is a flowchart illustrating one example of functionality implemented as portions of an availability service and a production service executed in a computing environment in the networked environment of FIG. 2 according to various embodiments of the present disclosure.

FIG. 4 is a flowchart 400 that provides one example of the operation of portions of the production system 218 (FIG. 2) and the availability service 224 (FIG. 2) according to various embodiments. It is understood that the flowchart of FIG. 4 provides merely an example of the many different types of functional arrangements that may be employed to implement the operation of the portions of the production system 218 and the availability service 224 as described herein. As an alternative, the flowchart 400 of FIG. 4 may be viewed as depicting an example of elements of a method implemented in the computing environment 203 (FIG. 2) according to one or more embodiments.

Beginning with box 401, the availability service 224 determines that steps in a workflow 261 are associated with external computing systems 239 (FIG. 2). In one example, the steps are determined to include or invoke API requests to the external computing systems 239. This determination in some examples is made before processing the workflow 261.

In box 403, the availability service 224 determines availability data 259 (FIG. 2). In one example, the availability service 224 uses a combination of a success rate-based availability component 242 (FIG. 2), a canary poller-based availability component 245 (FIG. 2), a schedule-based availability component 248 (FIG. 2), and/or a manual availability component 251 (FIG. 2) to generate success rate metrics 253 (FIG. 2), canary poller metrics 255 (FIG. 2), schedule data 257 (FIG. 2), and/or other data.

In box 406, the availability service 224 determines whether external computing systems 239 are available or potentially unavailable from the availability data 259. In various embodiments, this determination is made using one or more availability configuration rules 263 (FIG. 2), which in some examples is generated by automated action of one or more machine learning models 265 (FIG. 2). In various examples, the availability service 224 uses a linear combination of factors to assign a score, which is then compared to a threshold to determine whether an external computing system 239 is potentially unavailable. It is noted that the determination does not require that the workflow send an API request to the external computing system 239 and receive a failure. As such, the determination is of potential unavailability rather than necessarily a true unavailability.

In one example, the availability service 224 assigns a score to an external computing system 239 based on criteria including frequency and duration of outages, cost associated with outages (e.g., number of failed workflows), and a share of workflows routed through the external computing system 239. In this example, the score is computed based upon a summation of factors including: an external computing system's transaction rate divided by the total transaction rate across a set of external computing systems, an outage time per year multiplied by a constant and divided by a total time per year, a number of outages per year for an external computing system divided by a number of outages per year for a worst in the set of external computing systems, and a cost of outages for an external computing system multiplied by a constant and divided by a total revenue. This score allows for a comparison among multiple external computing systems 239 to determine a negative impact of outages and potentially to bias toward a finding of unavailability in view of the results.

In one example, the availability service 224 assigns an availability rate to an external computing system 239 based upon a number of valid responses minus a number of invalid responses, divided by a total number of requests. In another example, the availability service 224 assigns a time-based availability rate of a duration of outages per time period divided by a total length of a time period, which measures the percentage of time that the external computing system 239 is available.

In box 409, a workflow 261 is processed. Example workflows 261 include order checkout, subscription processing, payment account creation, and so forth. In box 412, the production system 218 determines that external computing systems 239 referenced in the workflow 261 are potentially unavailable. In one example, the workflow 261 includes a selection from among configured payment processing providers for a user account, with the selection triggering a corresponding external integration 233 (FIG. 2) with the external computing system 239 of the selected payment processing provider. For example, the production system 218 uses the availability configuration rules 263 and/or the availability data 259 to determine the potential unavailability.

In box 415, the production system 218 determines a response to the potential unavailability of the external computing system(s) 239. In various examples, such a response includes excluding an external integration 233 corresponding to the potentially unavailable systems from a user interface 269 (FIG. 2), delaying an action of the external integration 233, altering the external integration 233 (e.g., implementing retries), preventing a user selection of a component corresponding to the external integration 233, including a warning or recommendation not to select a component corresponding to the external integration 233, and so on. In one example, where the external computing system 239 is a payment processing provider, the production system 218 simply retries another payment method if the selected payment method fails, and no particular action is necessary to warn a user or prevent a selection.

In one example, the production system 218 takes an action in view of potential unavailability only after determining that at least one or more other external computing systems 239 are available for user selection as alternatives. For example, if all configured payment methods for a user account are determined to be potentially unavailable, the production system 218 determines not to surface the unavailability information to the user in some cases.

In box 418, the production system 218 generates a user interface 269 or performs a workflow action based at least in part on the potential unavailability of the external computing systems 239. In one example, an external integration 233 is excluded entirely from the user interface 269 when determined to be potentially unavailable with an unavailability score beyond a threshold. In one scenario, the production system 218 provides an indication that the integration with the external computing systems 239 is unavailable. Thereafter, the flowchart 400 ends.

Figure 5:
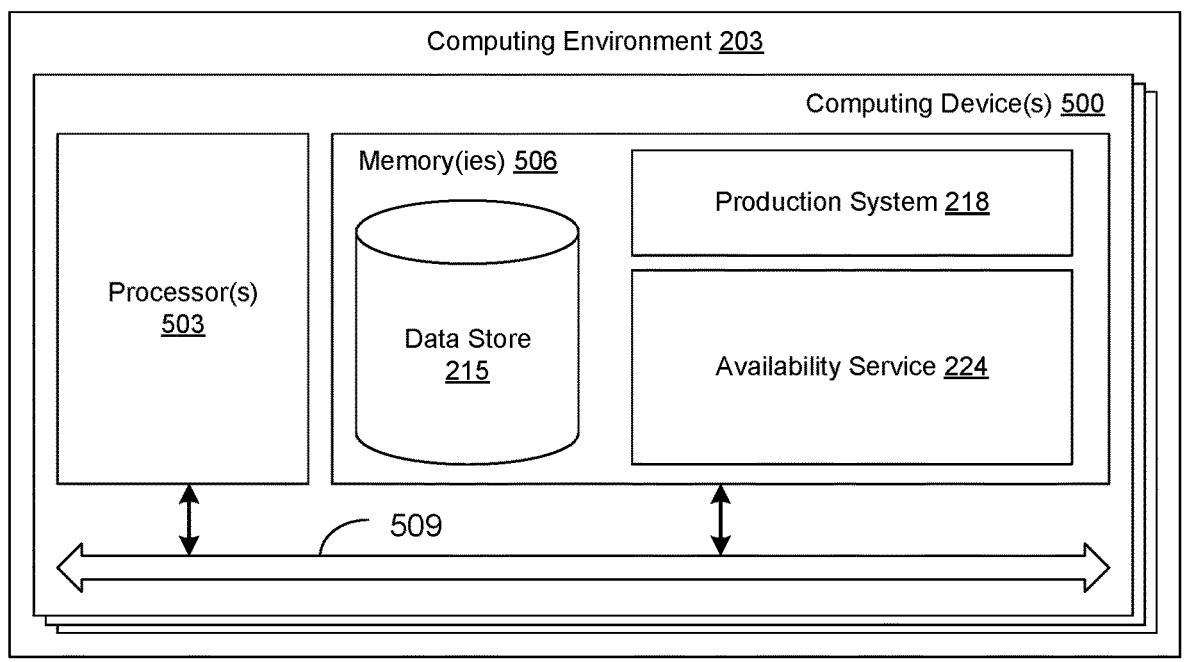
FIG. 5 is a schematic block diagram that provides one example illustration of a computing environment employed in the networked environment of FIG. 2 according to various embodiments of the present disclosure.

FIG. 5 is a schematic block diagram of the computing environment 203 according to an embodiment of the present disclosure. The computing environment 203 includes one or more computing devices 500. Each computing device 500 includes at least one processor circuit, for example, having a processor 503 and a memory 506, both of which are coupled to a local interface 509. To this end, each computing device 500 comprises, for example, at least one server computer or like device. The local interface 509 comprises, for example, a data bus with an accompanying address/control bus or another bus structure as can be appreciated.

Stored in the memory 506 are both data and several components that are executable by the processor 503. In particular, stored in the memory 506 and executable by the processor 503 are a production system 218, an availability service 224, and potentially other applications. Also stored in the memory 506 may be a data store 215 and other data. In addition, an operating system may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C #, Objective C, Java®, JavaScript®, Perl, PHP, Visual Basic®, Python®, Ruby, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and/or multiple processor cores and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the production system 218, the availability service 224, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 4 shows the functionality and operation of an implementation of portions of the availability service 224 and the production system 218. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowchart of FIG. 4 shows a specific order of execution, it is understood that the order of execution may differ from that which is depicted. For example, the order of execution of two or more blocks may be scrambled relative to the order shown. Also, two or more blocks shown in succession in FIG. 4 may be executed concurrently or with partial concurrence. Further, in some embodiments, one or more of the blocks shown in FIG. 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the production system 218 and the availability service 224, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the production system 218 and the availability service 224, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 500, or in multiple computing devices 500 in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
    at least one computing device; and
    at least one memory storing instructions executable in the at least one computing device, wherein when executed the instructions further cause the at least one computing device to at least:
        generate a user interface comprising a plurality of selectable components associated with a plurality of external computing systems, a selection of a respective selectable component providing access to a respective external computing system;
        determine one or more steps in a workflow that invoke a request to a particular external computing system of the plurality of external computing systems;
        determine availability information regarding the particular external computing system;
        before submitting the request within the workflow via an application programming interface (API) for processing by the particular external computing system, detect that the particular external computing system is potentially unavailable based at least in part on at least one of an improper rejection or a timeout of at least one previous request to the API of the particular external computer system; and
        modify the user interface to indicate a potential issue with the particular external computing system by modifying a visual appearance of a particular selectable component of the plurality of selectable components in response to detecting that the particular external computing system is potentially unavailable, the particular selectable component corresponding to the particular external computing system.

2. The system of claim 1, wherein when executed the instructions further cause the at least one computing device to at least generate the user interface as part of the workflow to include at least one other selectable option corresponding to at least one other integration with one or more other external computing systems.

3. The system of claim 2, wherein when executed the instructions further cause the at least one computing device to determine to provide an indication based at least in part on determining an availability of the at least one other integration with one or more other external computing systems as alternatives to the integration.

4. The system of claim 1, wherein when executed the instructions cause a selection of the visually modified particular selectable component to accept the request for processing when a potential availability of the particular external computing system is detected.

5. The system of claim 1, wherein determining the availability information further comprises determining that at least one other request to the API of the external computing system in a different workflow has failed.

6. The system of claim 1, wherein determining the availability information further comprises further comprises determining that the external computing system is affected by a scheduled downtime.

7. The system of claim 1, wherein the external computing system corresponds to a payment processing provider, the workflow is a checkout workflow of an electronic commerce provider, and a user selection of an integration causes the payment processing provider to be selected to process a payment for an order with the electronic commerce provider.

8. The system of claim 1, wherein the external computing system corresponds to a payment processing provider, the workflow is a payment account creation workflow of an electronic commerce provider, and a user selection of an integration causes the electronic commerce provider to add a payment account with the payment processing provider to a user account with the electronic commerce provider.

9. A method, comprising:
    generating a user interface comprising a plurality of selectable components associated with a plurality of external computing systems, a selection of a respective selectable component providing access to a respective external computing system;
    determining, via at least one of one or more computing devices, one or more steps in a workflow that invoke a request to a particular external computing system of the plurality of external computing systems;
    determining, via at least one of the one or more computing devices, availability information regarding the particular external computing system;
    before submitting the request within the workflow via an application programming interface (API) for processing by the particular external computing system, detecting, via at least one of one or more computing devices, that the particular external computing system is potentially unavailable based at least in part on at least one of an improper rejection or a timeout of at least one previous request via the API; and modifying, via at least one of one or more computing devices, the user interface to indicate a potential issue with the particular external computing system by modifying a visual appearance of a particular selectable component of the plurality of selectable components in response to detecting that the particular external computing system is potentially unavailable, the particular selectable component corresponding to the particular external computing system.

10. The method of claim 9, further comprising generating the user interface as part of the workflow to include at least one other selectable option corresponding to at least one other integration with one or more other external computing systems.

11. The method of claim 10, further comprising providing an indication based at least in part on determining an availability of the at least one other integration with one or more other external computing systems as alternatives to the integration.

12. The method of claim 9, wherein determining the availability information further comprises performing a canary polling function on the external computing system.

13. The method of claim 9, wherein determining the availability information further comprises determining that at least one other request to the API of the external computing system in a different workflow has failed.

14. The method of claim 9, wherein determining the availability information further comprises further comprises determining that the external computing system is affected by a scheduled downtime.

15. The method of claim 9, wherein the external computing system corresponds to a payment processing provider, the workflow is a checkout workflow of an electronic commerce provider, and a user selection of an integration causes the payment processing provider to be selected to process a payment for an order with the electronic commerce provider.

16. A non-transitory computer-readable medium embodying instructions executable in at least one computing device, wherein when executed the instructions cause the at least one computing device to at least:

generate a user interface comprising a plurality of selectable components associated with a plurality of external computing systems, a selection of a respective selectable component providing access to a respective external computing system;

determine one or more steps in a workflow that invoke a request to a particular external computing system of the plurality of external computing systems;

determine availability information regarding the particular external computing system;

before submitting the request within the workflow via an application programming interface (API) for processing by the particular external computing system, detect that the particular external computing system is potentially unavailable based at least in part on at least one of an improper rejection or a timeout of at least one previous request via the API; and modify the user interface to indicate a potential issue with the particular external computing system by modifying a visual appearance of a particular selectable component of the plurality of selectable components in response to detecting that the particular external computing system is potentially unavailable, the particular selectable component corresponding to the particular external computing system in response to detecting that the external computing system is potentially unavailable.

17. The non-transitory computer-readable medium of claim 16, wherein when executed the instructions further cause the at least one computing device to at least generate the user interface as part of the workflow to include at least one other selectable option corresponding to at least one other integration with one or more other external computing systems.

18. The non-transitory computer-readable medium of claim 16, wherein determining the availability information further comprises at least one of performing a canary polling function on the external computing system or determining that at least one other request to the API of the external computing system in a different workflow has failed.

19. The non-transitory computer-readable medium of claim 16, wherein the external computing system corresponds to a payment processing provider, the workflow is a payment account creation workflow of an electronic commerce provider, and a user selection of an integration causes the electronic commerce provider to add a payment account with the payment processing provider to a user account with the electronic commerce provider.

20. The non-transitory computer-readable medium of claim 16, wherein when executed the instructions further cause the at least one computing device to at least modify the user interface to cause an alteration of a selectable component corresponding to another external system in response to detecting that the other external computing system is potentially unavailable, the alteration of the selectable component corresponding to the other external system preventing a user selection of the selectable component corresponding to the other external system.

* * * * *